Feb. 26, 1957

H. OSTERBERG 2,782,676

REFLECTION REDUCTION COATINGS
AND METHOD FOR COATING SAME

Filed March 1, 1952

INVENTOR
HAROLD OSTERBERG
BY
*Louis L. Gagnon*
*Noble S. Williams*
ATTORNEYS

INVENTOR
HAROLD OSTERBERG
ATTORNEYS

Feb. 26, 1957

H. OSTERBERG 2,782,676

REFLECTION REDUCTION COATINGS
AND METHOD FOR COATING SAME

Filed March 1, 1952

INVENTOR
HAROLD OSTERBERG
BY
Louis L. Gagnon
Noble S. Williams
ATTORNEYS

United States Patent Office 2,782,676
Patented Feb. 26, 1957

2,782,676

REFLECTION REDUCTION COATINGS AND METHOD FOR COATING SAME

Harold Osterberg, Stamford, Conn., assignor to American Optical Company, Southbridge, Mass., a voluntary association of Massachusetts Application March 1, 1952, Serial No. 274,456

2 Claims. (Cl. 88—1)

This invention relates to an improved method for altering the light reflecting properties of optical elements, light-transmitting elements and the like formed of glass, certain crystals, plastic compositions, synthetic resins or other equivalent substrate, as well as to such coated optical elements and the like, having improved reflection-reducing characteristics resulting from the exercise of said improved method. More particularly the invention relates to a method of coating the surfaces of optical elements, and the like, with a coating which is preferably very hard and highly resistant to abrasive and chemical attack, which is composed of a plurality of layers of different dielectric materials so disposed on said element as to reduce to a very high degree or even substantially completely, reflections from the surface of the element at the preselected wave length at which it is to be used, and whether this surface is an exposed surface or an interface between optical elements. Also improved integrated reflectivity at a range comprehending this selected wave length is obtained. The invention also provides improved transmission characteristics in such coated elements. Furthermore, the improved method can be effected readily and without difficulty.

Much research has already been carried on in an endeavor to reduce to the highest possible degree light reflections from the surfaces of transparent optical elements and the like, such as lenses, prisms, filters, etc., and while coated optical elements providing greatly improved results have already been obtained by some of the best of these certain prior coating processes, they were nevertheless exceedingly difficult to control properly and in other processes some light reflections were experienced. Of course, at times, any appreciable amount of light reflected from the surfaces of an optical element, or the like, may be of material importance and most undesirable. For example, considerable light can be lost when reflected from the surfaces of a compound optical system such as a telephoto camera lens, or reflection from an optical element of a microscope may produce an objectional ghost image. Furthermore, in a compound system even though each individual surface reflection may be small, collectively they may materially lower the overall transmission efficiency of the system by an objectionable amount.

It has now been found by following the teaching of the present invention and by proper use and control of predetermined coating materials, coated optical elements having substantially zero reflectivity at a preselected wavelength can be produced in a practical manner and by a method which may be easily performed and readily controlled. Decidedly lower integrated reflectivity for a spectral range (such as the visible) comprehending the selected wavelength may be had by such improved optical elements and the like, and as will be readily appreciated, such is most desirable for many optical purposes. Furthermore, the coated optical element having such high reflection-reducing properties may be made very hard and highly inert and can be so applied as to provide a maximum reduction in reflection at any of a wide range of selected wavelength either within the visible, ultraviolet or infrared regions of the spectrum.

It is, accordingly, an object of the present invention to provide an optical element or the like having a reflection-reduction coating formed by a plurality of superimposed and accurately controlled layers of transparent dielectric material and disposed thereon in such a manner as to substantially completely eliminate reflection from the surface or surfaces thereof for light of a preselected wavelength.

It is also an object to provide optical elements and the like having such low reflection coating and which coating may be made exceedingly hard, inert and durable.

It is a further object of the invention to provide improved coated optical elements having very low reflectivity at a preselected wavelength as well as greatly improved integrated reflectivity for an appreciable spectral range comprehending this particular wavelength.

It is also an object of the present invention to provide a method for producing such coated optical elements in a manner which is inexpensive to perform and which may be readily controlled and maintained within the tolerances required for effecting such improved coated optical elements and the like.

Other objects and advantages of the invention will become apparent from the detailed description which follows when taken in conjunction with the accompanying drawing in which.

Figure 1:
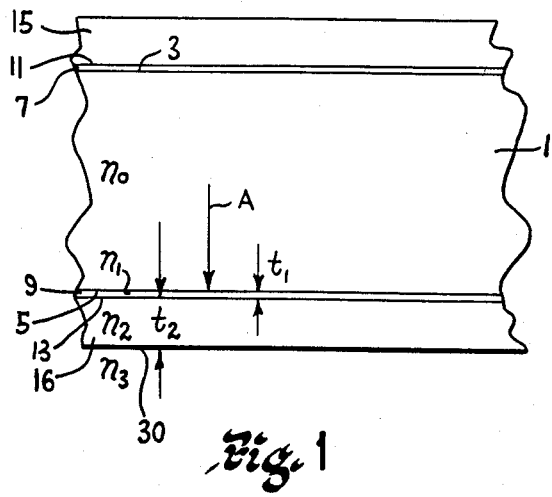
Fig. 1 is a diagrammatic sketch showing a fragmentary view of a light transmitting optical element or the like, such as a filter, reticle, prism or lens, coated upon opposite sides thereof with layers of selected materials and arranged to facilitate an understanding of the present invention.

Referring to the drawing in detail and particularly Fig. 1, it will be seen that the numeral 1 indicates a portion of a transparent optical element, such as a plane parallel glass reticle, which has located upon opposite surfaces 3 and 5 thereof very thin layers 7 and 9 of a suitable material of relatively high refractive index and carefully controlled thicknesses. Either or both of these layers 7 and 9 may comprise metallic oxides of high refractive index such as aluminum oxide, iron oxide, tin oxide, titanium oxide, etc., or other durable, inert high index dielectric materials such as stibnite, sphalerite, titanium nitride, silver sulphide, etc. Upon the exposed surfaces 11 and 13 of layers 7 and 9 are located somewhat thicker layers 15 and 16 of a suitable dielectric material of lower refractive index and also carefully controlled thicknesses. Such layers 15 and 16 may comprise suitable dielectric materials as metallic fluorides, cryolite, silicon monoxide and quartz.

It is known that zero light reflectivity at a selected wavelength may be obtained by a single layer or film upon glass provided the refractive index of the film is equal to the square root of the refractive index of the glass and provided the optical path or optical thickness (thickness times refractive index) of the material constituting the layer is equal to one fourth of a wavelength of said light. However, one cannot find in a single film of material a refractive index which will provide such a condition when used upon ordinary spectacle crown glass, for instance, having a refractive index in the neighborhood of 1.52. In fact one cannot satisfactorily produce such a condition artificially by reducing the density of the applied film since such a film would be much too soft to be practical.

However, if a bilayer coating is employed upon an optical element or the like of a known index of refraction and the thicknesses of the two layers carefully controlled relative to each other and the indices thereof and relative to the index of the substrate material upon which they are carried in accordance with the teaching of this invention, zero or substantial zero reflectivity at a preselected wavelength can be obtained and also a greatly improved integrated reflectivity for a spectral range including the selected wavelength. The above mentioned materials for making up layers 7 and 9 have relatively high indices of refraction, in the neighborhood of 2.0 or more, as compared to spectacle crown glass, or flint glass or other substrate material upon which they are carried and as compared to the index of refraction of the material or materials thereon constituting layers 15 and 16. It can be shown mathematically that if a layer of such a selected high index dielectric material is made of a proper thickness and that a layer of a selected dielectric material of lower index and of properly controlled thickness are provided upon the surface 3 or the surface 5 of the optical element of preselected refractive index, substantially complete elimination of reflection from such surface may be effected for the selected wavelength.

If we are to consider a light ray, such as that indicated by the arrow A in Fig. 1, traveling through the optical element 1 and arrange a coating for this element such as to provide zero reflectivity at the surface 5 of the element, we will be able to ascertain or determine readily the index of refraction, $n_0$, of the element, also the wavelength, $\lambda$, of the selected light ray. The letter $t_1$ may be used to indicate the thickness of the first or high index layer 9 and $n_1$ refractive index thereof. Likewise, the letter $t_2$ may be used to indicate the thickness of the second or lower index layer 16 and $n_2$ the refractive index thereof. It will then be possible to express the optical thickness or optical paths $p_1$ and $p_2$ of the first and second layers 9 and 16 as follows:

$$p_1 = \frac{n_1 t_1}{\lambda} \quad (1)$$

and $$p_2 = \frac{n_2 t_2}{\lambda} \quad (2)$$

and these numerical optical path values may be also expressed in radians or degrees as follows:

$$p_1 = \frac{2\pi n_1 t_1}{\lambda} \text{ radians; or} = \frac{360 n_1 t_1}{\lambda} \text{ degrees} \quad (3)$$

and $$p_2 = \frac{2\pi n_2 t_2}{\lambda} \text{ radians; or} = \frac{360 n_2 t_2}{\lambda} \text{ degrees} \quad (4)$$

Now if a highly efficient reflection-reduction coating is to be applied to the surface 5 of optical element 1 to provide zero reflectivity at this surface for a selected wavelength and this coating is to be exposed to air, then in accordance with the concept of the invention $$n_1 > n_2; \; n_1 > n_0; \; n_2 > n_3$$

In this case $n_3$ the index of refraction of the material adjacent the layer 16 may be represented as $n_a$, the index of refraction of air, and of course will then be equal to a numerical value of 1. Also the Fresnel coefficients $w_1$, $w_2$ and $w_3$ for the interfaces between the adjacent materials may be calculated from the following equation:

$$w_u = \frac{n_{u-1} - n_u}{n_{u-1} + n_u}; \; u = 1, 2 \text{ or } 3 \quad (5)$$

The optical thicknesses $p_1$ and $p_2$ which the two layers 9 and 16 must have in order to obtain zero reflectivity with this chosen combination of materials are given by the following relations:

$$\cos 2p_1 = \frac{w_3^2(w_1^2 w_2^2 + 1) - w_1^2 - w_2^2}{2 w_1 w_2 (1 - w_3^2)} \quad (6)$$

in which one is to choose the particular solution for which:

$$0 < 2p_1 < 90°; \text{ or } p_1 < \frac{1}{8}\lambda \quad (7)$$

with $2p_1$ being determined from Equations 6 and 7 then $$-2p_2 = \theta_1 - \theta_2 \quad (8)$$

where $\theta_1$ and $\theta_2$ are values determined by the following Equations 9A and 9B, respectively:

$$\sin \theta_1 = -w_1 \sin 2p_1; \; \cos \theta_1 = -(w_1 \cos 2p_1 + w_2) \quad (9A)$$
$$\sin \theta_2 = w_1 w_2 \sin 2p_1; \; \cos \theta_2 = w_1 w_2 \cos 2p_1 + 1 \quad (9B)$$

Equations 9A and 9B determine $\theta_1$ and $\theta_2$ uniquely and hence $2p_2$ uniquely when $2p_1$ has been calculated from Equations 6 and 7.

The particular solution $2p_1$ satisfying Equation 7 involves the smallest possible optical thicknesses for the film or layer 9. The optical thickness $2p_1$ may be decreased by choosing the refractive index $n_1$ of this layer relatively high as compared to the refractive index $n_0$ of the optical element and as compared to the refractive index $n_2$ of the second layer 16. This optical thickness may be further reduced by choosing the second layer 16 so that the square of the refractive index $n_2$ thereof falls in the neighborhood of the refractive index $n_0$ of the material of the optical element.

Besides having coatings upon optical elements which will provide high reflection-reduction characteristics and high transmission characteristics, other features such as durability, stability, resistance to scratches and abrasion, resistance to chemical attack, bonding qualities, and ease and cost of application are often needed in accordance with the particular use to which the coated elements are to be put. A combination of materials which has been found to be very satisfactory in providing most of these features at a very high level is a first very thin layer of titanium oxide of carefully controlled thickness covered by a second thicker layer of magnesium fluoride of carefully controlled thickness. This has proved to be a very satisfactory combination when applied to certain glasses not only because titanium oxide ($TiO_2$) has a fairly high index of refraction, in the neighborhood of 2.5, but also because the square of the refractive index 1.38, of magnesium fluoride ($MgF_2$) is not far removed from the numerical value of the refractive index of the particular glass forming the substrate. If we employ these values in the Equations 6, 7, 8, 9A and 9B and use $n_3$ equal to 1 since air will be adjacent the layer 16, we may compute the values for the optical thicknesses $p_1$ and $p_2$ for layers 9 and 16. Such optical path values have been plotted against the refractive indices of the glasses upon which these layers may be applied in Figs. 2A and 2B respectively. Inspection of the resultant curves in Figs. 2A and 2B will show, that in order to obtain zero reflectivity for a spectacle crown glass having a refractive index of 1.52 an optical path of value of 15.92 degrees or approximately $\frac{1}{22}\lambda$ for the titanium oxide should be employed and an optical path value of 117.90 degrees or approximately $\frac{1}{3}$ wavelength for the magnesium fluoride should be used.

Or if a flint glass having a refractive index of $n_0 = 1.72$ were to be used in air it will be seen that an optical thickness for the titanium dioxide layer of 14.37 degrees or approximately 1/20 wavelength will be indicated and an optical thickness for the magnesium fluoride layer of 106.91 degrees or approximately 1/3 wavelength will be shown.

Figure 2A:
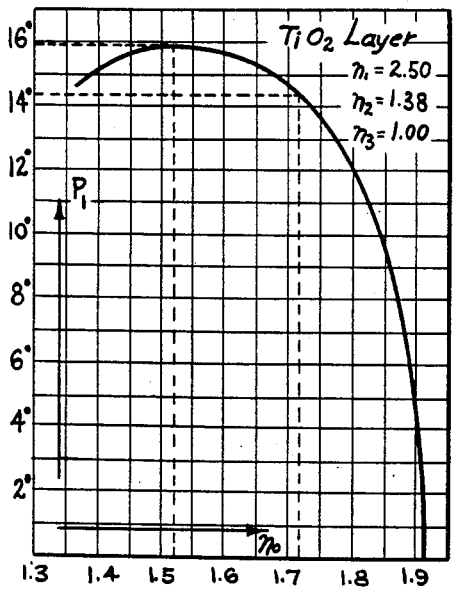
Figs. 2A and 2B show a pair of graphs for use in providing a reflection-reduction coating comprising titanium oxide and magnesium fluoride upon glass.
Figure 2B:
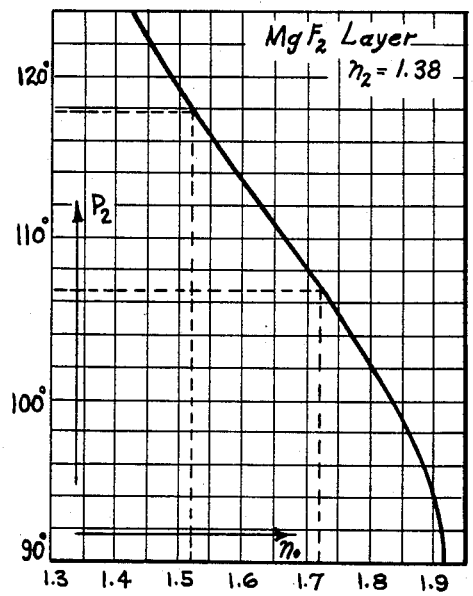

Inspection of Fig. 2A shows that the curve for titanium dioxide is nearly flat and that it is closely comprehended between the lines for 14.0 and 16.5 degrees. It also shows that this part of the curve extends over a range of refractive indices between approximately 1.35 and 1.80; an index range which includes many commercially available glasses, etc. This means that whereas substantially zero reflectivity will be obtained by using a titanium dioxide layer having an optical thickness in the range of 14.0 to 16.5 degrees, very, very low reflectivity will be obtained for most commercially available glasses by using therewith a $TiO_2$ layer having an optical path of substantially 15 degrees. Figs. 2A and 2B show also that the optical path value for $p_1$ approaches zero and the optical path value for $p_2$ approaches 90 degrees as the refractive index $n_0$ of the glass approaches 1.915; a value which is the square of 1.38, the refractive index $n_2$ for the magnesium fluoride.

In actual practice the refractive index of magnesium fluoride may depart slightly from 1.38 and the refractive index of titanium oxide may depart somewhat from 2.5. If these departures are small, substantially zero reflectivity will be obtained. When said departures in practice become significant, improved or lower reflectivities may be obtained by recomputing the data for the curves of Figs. 2A and 2B from the Equations 6 to 9 after having redetermined the Fresnel coefficients $w_u$ from the more appropriate physical values available for $n_1$ and $n_2$.

Figure 3A:
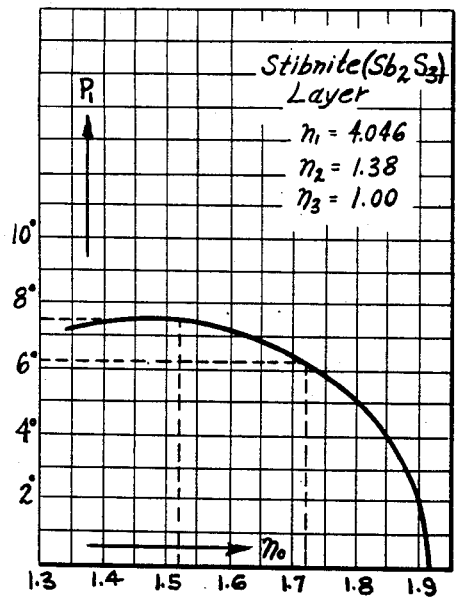
Figs. 3A and 3B show a pair of graphs for use in providing a reflection-reduction coating comprising stibnite and magnesium fluoride upon glass.
Figure 3B:
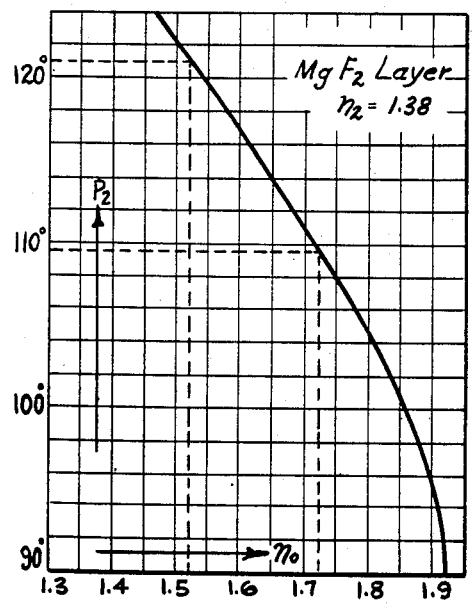

If it is desired to replace the titanium oxide by stibnite (antimony tri-sulphide) as the first or high index layer 9 while still using magnesium fluoride as the second layer 16, different values will be encountered since the refractive index of stibnite is approximately 4.04. The optical thicknesses $p_1$ and $p_2$ for the layers 9 and 16 respectively would be computed from Equations 6 to 9 and a new pair of curves plotted against the refractive index of the substrate (which of course might be glass, but could be some other material of equivalent index values). Such a new pair of curves are shown in Figs. 3A and 3B. Note that one of these curves approaches zero degrees and the other 90 degrees at approximately $n_0=1.915$, the square of $n_1=1.38$. Although the usable stibnite layer or film will be extremely thin, zero or substantially zero reflectivity conditions at the selected wavelength can be expected by the use of the data of these figures when properly applied.

Thus, if spectacle crown glass of 1.52 index is used, the optical thickness of the stibnite layer 9 will be indicated from the curve of Fig. 3A to be approximately 7.4 degrees or approximately 1/50 wavelength and the corresponding optical thickness for the magnesium fluoride layer 16 indicated by the curve of Fig. 3B will be approximately 121 degrees or approximately 1/3 wavelength. Or if the flint glass is used, having its $n_0$ value equal to approximately 1.72, then from the curves of Figs. 3A and 3B it will be readily observed that the first layer 9 of stibnite should have an optical path value of 6.2 degrees or approximately 1/60 wavelength and the second layer 16 of magnesium fluoride should have an optical path value of approximately 109.6 degrees or a little less than 1/3 wavelength.

In such cases where extremely thin films, such as the stibnite layers 9, are being applied to the optical elements it will be worth while to bear in mind that the electromagnetic theory of films may not hold strictly under all conditions of application and measurable errors may be observed. Under such circumstances the data from Figs. 3A and 3B may be taken as a first approximation and the reflectivity thereafter lowered slightly by very slight increasing or decreasing the optical path of the stibnite layer.

Inspection of Fig. 3A shows that the curve for stibnite is nearly flat and closely comprehended between the lines for 6.0 and 8.0 degrees and that this part of the curve extends over a range of refractive indices between approximately 1.35 and 1.75.

Figure 5A:
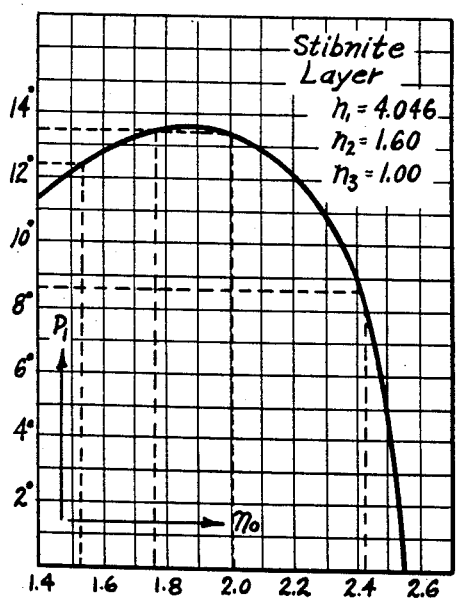
Figs. 5A and 5B show a pair of graphs for use in providing a reflection-reduction coating comprising stibnite and silicon monoxide on glass.
Figure 5B:
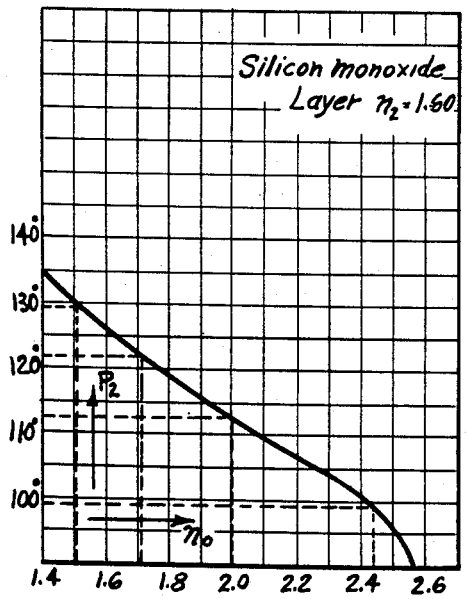

Figs. 5A and 5B show curves plotted for stibnite as the first layer 9 and silicon monoxide as the second layer 16, as derived from Equations 6 to 9 and using $n_1=4.05$ and $n_2=1.60$. It will be noted that the curve of Fig. 5A is similar in shape to the curves of Figs. 2A and 3A and entirely below 15 degrees. While it rises with increasing $n_0$ in the range of $n_0=1.40$ to 1.75 corresponding to many commercial glasses, it is approximately horizontal at $n_0=1.9$, and it decreases rapidly beyond $n_0=2.05$. It becomes equal to zero at 2.56, the square of $n_2=1.60$.

For coating spectacle crown glass of $n_0=1.52$ an optical path value of approximately 12 degrees or about 0.034 wavelength should be used for the stibnite layer and an optical value of approximately 130 degrees or about 0.36 wavelength for the silicon monoxide layer. Likewise, for flint glass $p_1$ should equal approximately 13½ degrees or about 0.037 wavelength and the $p_2$ value should be approximately 120 degrees or about 0.34 wavelength. Here it should be noted that silver chloride crystals, which among other things are useful in transmitting infra-red radiation, might be, at times, used as the substrate and treated to such a bilayer coating. This dielectric has a refractive index of approximately 2.0 when a radiation of about 7 microns is employed and a refractive index of 2.0 is well within the $n_0$ range indicated on Fig. 5A. As indicated upon the curve of Fig. 5A the stibnite layer would have an optical thickness $p_1=13.4$ degrees or about 0.037 wavelength and upon the curve of Fig. 5B the silicon monoxide second layer would have a $p_2$ value equal to approximately 110 degrees or a little less than 1/3 wavelength. Even diamond with a relatively high refractive index (2.417 for the sodium D line), is shown in Fig. 5A to be within the $n_0$ range for the substrate material, providing a value of approximately 8.5 degrees or about .02 wavelength for the stibnite layer. The silicon monoxide layer should be equal to approximately 100 degrees for zero reflectivity.

In the preceding examples of bilayer dielectrics upon different substrate materials, it will be noted that certain conditions persist. The first layer material has a very high index of refraction relative to the material upon which it is to be used. Also this first layer is very, very thin, in all cases much less than a quarter wavelength. On the other hand, the second layer material has a much lower refractive index with reference to the index of the first layer and its thickness is in all cases appreciably more than a quarter of a wavelength. In most cases, in fact, it is approximately equal to 1/3 wavelength or a little less. Furthermore, the curves for the first layers as shown by Figs. 2A, 3A and 5A all have fairly flat tops indicating a maximum range. The condition under which these curves of optical path ($p_1$) relative to refractive index of the glass ($n_0$) will show a maximum in the range of $n_0$ below a value wherein $n_0=n_2{}^2$ is:

$$n_1{}^2 > n_2{}^2 n_0 > \begin{cases} n_2{}^2 \\ n_0{}^2 \end{cases} > n_0 \qquad (10)$$

This condition will surely be satisfied when $n_1$ of high index material is chosen high relative to $n_2$ and high relative to $n_0$, as in the case of Figs. 2A, 3A and 5A.

If the condition of Equation 10 is not satisfied by a suitable choice of materials for the first and second layers relative to the substrate, then one cannot expect the trend illustrated in Figs. 2,A, 3A and 5A, but may encounter other trends. For example, if the first layer is to be titanium dioxide and the second layer silicon monoxide, which have their indices of refraction less widely separated, it will be seen that when $n_0=2.44$, the square of $n_1(6.25)$ will equal the square of $n_2(2.56)$ times $n_0(2.44)$ or 6.25. Thus when $n_0$ is greater than 2.44, $n_1{}^2$ (of the titanium dioxide layer) will be less than $n_2{}^2 \times n_0$, so that condition of Equation 10 will not be satisfied for values of $n_0$ in a range above 2.44.

Figure 4:
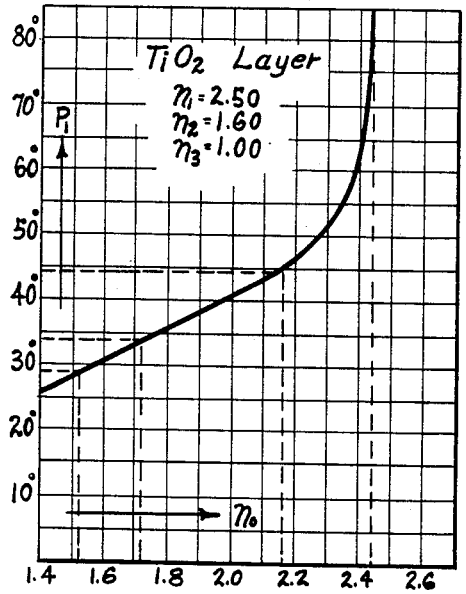
Figs. 4A and 4B show a pair of graphs for use in providing a reflection-reduction coating comprising titanium oxide and silicon monoxide upon glass.
Figure 4:
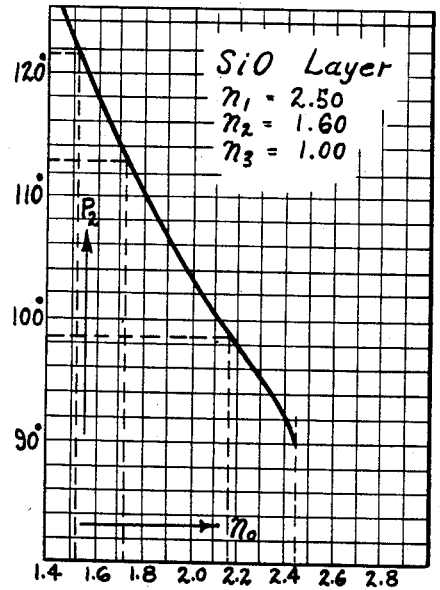

Because the Equation 10 is violated for values of $n_0$ in the range 2.44 to 2.56, the completed graphs of Figs. 4A and 4B indicate no possible solution for values immediately above said range. It will be seen from Fig. 4A that the curve for titanium dioxide starts to rise much more rapidly above 45° to 50° and accordingly would be more critical. However, an optical path of approximately 45 degrees or ⅛ wavelength is indicated at a refractive index of 2.18 and most all commercial needs for reflection-reduction coatings are with substrate materials of refractive indices of approximately 2.0 or less.

Figure 6:
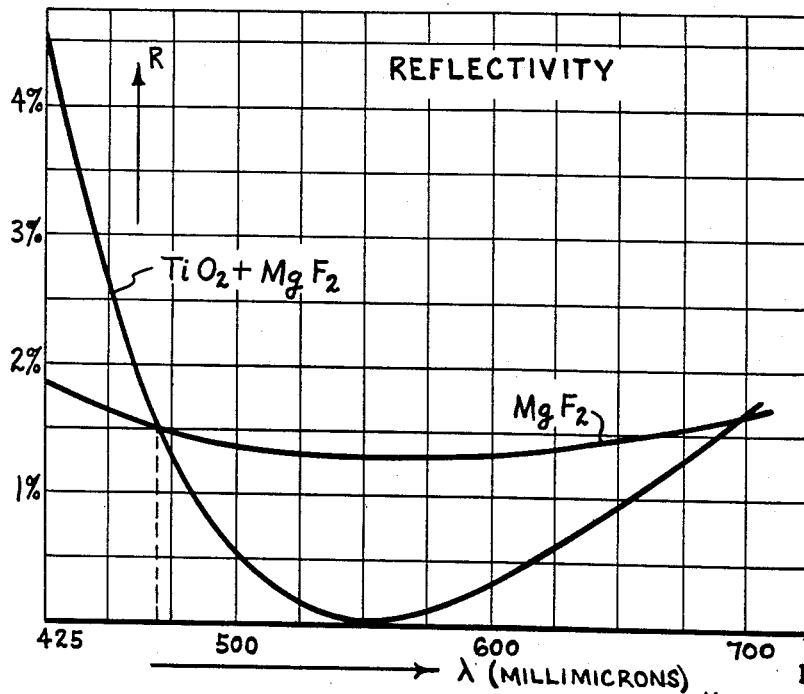
Fig. 6 is a graph showing a range of reflectivities which may be obtained under preselected conditions.

It has been repeatedly stated heretofore that the substantially zero reflectivity obtained using bilayer coatings by following the teachings of the invention are computed with reference to a preselected wavelength. While all other wavelengths are not reduced equally, it is well to note that improved results are obtained over integrated ranges. For example, a controlled bilayer coating formed by a first layer of titanium dioxide and second layer of magnesium fluoride may be placed upon a spectacle crown element of 1.52 refractive index and computed to give substantially zero reflectivity at 550 millimicrons as shown in Fig. 6. This figure also shows reflectivities for other wavelengths above and below the selected wavelength from 425 to 700 millimicrons.

As shown by Figs. 2A and 2B the first layer of the bilayer coating would preferably have an optical thickness of approximately 16 degrees and the second layer an optical thickness of 118 degrees. Also shown on Fig. 6 is a reflectivity curve for magnesium fluoride as a single layer coating controlled to give a minimum reflectivity at approximately 550 millimicrons. Not only is a material decrease in reflectivity shown at 550 wavelength by the controlled bilayer coating as compared to the single magnesium fluoride layer (from 1¼ percent to substantially zero percent), but also the entire integrated reflectivity range for the bilayer coating between approximately 470 and 700 millimicrons is appreciably improved. While this reflectivity range covers a very material part of the visible spectrum and acordingly is very useful for many purposes, it might at times be desirable to have minimum integrated reflectivity for the entire visible range, as when best "white light" conditions are sought for. At such times it might be better to compute the optical path values $p_1$ and $p_2$ for the two layers using $R=O$ at a predetermined wavelength 525 millimicrons.

It is interesting to note that a bilayer coating of stibnite plus magnesium fluoride computed for a minimum reflectivity at 550 wavelength has practically the same spectral reflectivity curve as that shown in Fig. 6 for titanium dioxide and magnesium fluoride. In all of the improved bilayer coatings disclosed, if zero reflectivity with incident light of a particular wavelength is obtained with the light traveling through the glass substrate material to the film, the reflectivity will be zero also in the opposite direction with the light traveling from the air through the film into the substrate.

Other high index materials which might be used for the first layer 9 could include titanium nitride, silver sulphide and sphalerite, all of which have refractive indices of approximately 2.0 or more. Second layer materials of low indices which may be used and which have valuable protective properties are other metallic fluorides, quartz and cryolite. Most of the high index materials may be best applied by known high vacuum distillation means. Chemical deposition of certain of these first layer materials may be used. It has also been found preferable to apply the second layer 16 of lower index material by vacuum deposition, and at times both layers successively during an evacuation of the apparatus being used. Of course, a cut and try method of application could be attempted, but if the first layer is of wrong optical thickness and the second is applied thereto before the element is measured for reflectivity it would be too late to correct the condition.

It is for this reason that the value of the reflectivity of the first layer at all times during deposition in the vacuum chamber should be known. From its value the optical path value $p_1$ of the layer may be constantly monitored. Since all of the high index materials forming the first layer 9 must necessarily be very, very thin and must be substantially of correct optical thickness, as indicated above, and since they are at the same time highly transparent, the accurate forming and measuring of such a layer is not a simple matter. Vacuum deposition of stibnite, for example, onto a substrate of glass is possible and in this case the correct optical thickness of this first layer may be obtained during deposition by using the following information. Let $R_1$ denote the reflectivity of the glass surface that is being coated with stibnite. This reflectivity value $R_1$ may be calculated by using Equations 11, 12 and 13, which follow, using the required optical thickness $p_1$ of the stibnite layer for zero reflectivity at the selected wavelength.

If we know what the value of $R_1$ should be, photometric apparatus of known character can be used. A plate of glass may be placed in the vacuum chamber and used as a monitoring plate, the reflectivity of this plate may be represented as $R_p$. This value $R_p$ will be due in turn to two reflectivities, the reflectivity $R_1$ of the coated surface and the reflectivity $R_2$ of the uncoated surface of the plate. Letting $n_1$ again denote the refractive index of the dielectric material of layer 9 and letting $n_g$ denote the refractive index of the monitoring plate, we may obtain the following equations:

$$w_1 = \frac{1-n_1}{1+n_1} \tag{11}$$

and $$w_2 = \frac{n_1 - n_g}{n_1 + n_g} \tag{12}$$

and $$R_1 = \left[ \frac{w_2 e^{-i2p_1} + w_1}{w_1 w_2 e^{-i2p_1} + 1} \right]^2 \tag{13}$$

in which $i = \sqrt{-1}$, and $e = 2.71828$ the natural base for logarithms, and in which $(Z)^2$ denotes the square of the absolute value of the enclosed complex number Z (the fraction in the right hand part of Equation 13).

$R_2$ denoting the reflectivity of the uncoated surface of the monitoring plate can be expressed as follows:

$$R_2 = \left(\frac{1-n_g}{1+n_g}\right)^2 \tag{14}$$

With $R_1$ and $R_2$ calculated from Equations 13 and 14 the reflectivity value $R_p$ for the monitoring plate will be:

$$R_p = \frac{R_1 + R_2 - 2R_1 R_2}{1 - R_1 R_2} \tag{15}$$

If the monitoring plate is of the same index as the element to be coated, the value $R_p$ will equal the plate reflectivity value which is to be obtained during monitoring.

If spectacle crown glass of $n_0=1.52$ is to be coated with a first layer of stibnite and a second layer of magnesium fluoride, it will be seen from Fig. 3A that the required value for $p_1$ is 7.39 degrees. If the monitoring plate is of glass having $n_g=1.52$ then from Equations 11 to 13 a value for $R_1$ of 0.0744 may be obtained and from Equation 14 a value for $R_2$ of 0.04245. From Equation 15 the required reflectivity $R_p$ for the monitoring plate will be 11.1%. Thus, when the reflectivity reading from the monitoring plate reaches 11.1% a stibnite layer having an optical thickness $p_1$ equal to 7.39 degrees will be provided. This is a value which will, when combined with the magnesium fluoride layer of 120° optical path, provide substantially zero reflectivity at the preselected wavelength.

In the forming of certain of the high index materials as first layers, it has been found desirable to deposit the material in metallic form upon the element by vacuum distillation. Not withstanding the very, very thin nature of this layer, it can be uniformly applied and a good bond can be obtained. Furthermore, being in its metallic form the reflectivity of the layer will be much higher and may be monitored more accurately. Titanium metal, for example, may be so applied. One convenient method which may be followed at this time would be to then deposit the second layer 16 of low index material upon the titanium metal while the optical element is still in the evacuated chamber. The optical element may then be removed from the vacuum chamber and subjected to a heating operation in the presence of air or oxygen at a temperature preferably in the neighborhood of 350° to 500° centigrade for an extended period of time, preferably in the neighborhood of 15 to 60 hours, to thereby bring about a substantially complete oxidation of the titanium to titanium oxide; said oxidation being effected through the outer dielectric layer. Such a process has the advantage that high vacuum need be produced only once. A lower temperature would require a longer heating period and a temperature as low as 200° C. or so may be used. However, the higher temperatures require less time and are therefor preferred.

Alternatively, it might be desirable after the first metallic layer has been formed in high vacuum to remove the optical element from the vacuum and to heat sufficiently in the presence of oxygen or air to completely oxidize this very, very thin layer. The element would thereafter be again placed in the vacuum chamber and the second dielectric material applied.

While both methods are satisfactory the first has a manufacturing advantage in that the act of oxidizing through the second layer additionally simultaneously hardens the second layer. However, much time is often required to effect this oxidation step through the dielectric layer, and for this reason it might be at times preferable to employ the second method. In certain cases the second method may be followed by a separate heat-hardening step. A silver-sulphide first high index layer may be formed first as a metal and then treated in a similar way, if desired, but of course by using hydrogen sulphide in place of air or oxygen. First high index layers of titanium nitride, zinc sulphide and antimony sulphide, likewise are possible using a similar technique.

When the titanium is first applied as a metal, for example, in the formation of the coated spectacle crown glass of Figs. 2A and 2B, the transmission of the optical element (or of the monitoring plate therefor) may be measured until it drops to 48 to 55 percent of the transmission of the uncoated element or plate. A source of light filtered to give a radiation at .55 micron, for example, may be used as the illuminant. When such a coating is oxidized, the reflectivity of the monitoring plate will fall to a range between 11 and 11.7%. And of course, as previously stated, the optical thickness or optical path at such a percentage will fall within the range of 15 to 16 degrees. Because the refractive index of cryolite is near that of magnesium fluoride, much the same ranges may be used.

Having described my invention, I claim:

1. An optical element having a hard, durable reflection-reduction bilayer coating bonded to a surface thereof and arranged to provide an exposed surface having substantially zero reflectivity at a preselected wavelength, said optical element being formed of a transparent material having a predetermined refractive index $n_0$, a first layer of substantially clear dielectric material having a high refractive index $n_1$ relative to the refractive index of said optical element and being a value within the range of 1.8 to 4.5, said first layer being disposed upon said surface of said element and providing a first interface therebetween, and a second layer of substantially clear dielectric material having a low refractive index $n_2$ relative to the refractive index of said first layer and being a value within the range of 1.3 to 1.6, said second layer being disposed upon the surface of said first layer and providing a second interface therebetween, the optical with path value $p_1$ (the actual thickness expressed in wavelength value × refractive index $n_1$) of said first layer being in a range between $\frac{1}{20}$ of a wavelength to $\frac{1}{100}$ of a wavelength at said preselected wavelength and being that value within said latter range which satisfies the following equation:

$$\cos 2p_1 = \frac{w_3^2(w_1^2 w_2^2 + 1) - w_1^2 - w_2^2}{2w_1 w_2 (1 - w_3^2)}$$

and wherein $w_1$ is the Fresnel coefficient for the interface between the optical element and said first layer and is equal to $$\frac{n_0 - n_1}{n_0 + n_1}$$

wherein $w_2$ is the Fresnel coefficient for the interface between the first and second layers and is equal to $$\frac{n_1 - n_2}{n_1 + n_2}$$

and wherein $w_3$ is the Fresnel coefficient for the interface between the second layer and air and is equal to $$\frac{n_2 - n_3}{n_2 + n_3}$$

and wherein $n_3$ indicates the refractive index of air to which said second layer is to be exposed, and the optical path value $p_2$ (the actual thickness expressed in wavelength value × refractive index $n_2$) of said second layer being in a range between a little more than ¼ wavelength to a little more than ⅓ wavelength at said preselected wavelength and being that value which satisfies the equation:

$$-2p_2 = \theta_1 - \theta_2$$

wherein $\theta_1$ and $\theta_2$ are interrelated angular values, $\theta_1$ being dependent upon said selected optical path value $p_1$ for said first layer and the coefficients $w_1$ and $w_2$ for the interfaces adjacent said first layer as established by the following pair of equations $$\sin \theta_1 = w_1 \sin 2p_1$$

and $$\cos \theta_1 = -(w_1 \cos 2p_1 + w_2)$$

and $\theta_2$ being dependent upon said selected $p_1$ value and the interface coefficients $w_1$ and $w_2$, as established by the following pair of equations $$\sin \theta_2 = w_1 w_2 \sin 2p_1$$

and $$\cos \theta_2 = w_1 w_2 \cos 2p_1 + 1$$

and wherein the following relationships of refractive indices $$n_1^2 > n_2^2 n_0 > n_2^2$$

and $$n_1^2 > n_2^2 n_0 > n_0^2$$

for the selected materials of said first and second layers and said optical elements are satisfied.

2. The method of forming upon a surface of an optical element having a predetermined refractive index $n_0$ a bilayer coating of controlled characteristics so as to provide a hard, durable exposed surface providing substantially zero reflectivity at a preselected wavelength, said method comprising preselected a material for forming a first layer upon said surface of said optical element, preselecting a material for forming a second layer upon said first layer, the material of said first layer being a relatively high index dielectric material relative to the refractive index of said optical element and having a predetermined refractive index $n_1$ of a value within the range of 1.8 to 4.5, the material of said second layer being of a low index dielectric material having a refractive index $n_2$ of a value within the range of 1.3 to 1.6, depositing said first layer on said optical element to an optical path value of $p_1$ determined in accordance with the known values of refractive indices $n_1$ and $n_2$ of said materials, and in accordance with the known value of the refractive index $n_0$ of said optical element and the refractive index $n_3$ of air, said optical path value $p_1$ (the actual thickness expressed in wavelength $\times$ refractive index $n_1$) being in a range between $\frac{1}{20}$ of a wavelength to $\frac{1}{100}$ of a wavelength at said preselected wavelength and being that value within said range which satisfies the following equation:

$$\cos 2p_1 = \frac{w_3^2(w_1^2 w_2^2 + 1) - w_1^2 - w_2^2}{2w_1 w_2 (1 - w_3^2)}$$

and wherein $w_1$ is the Fresnel coefficient for the interface between the optical element and said first layer and is equal to $$\frac{n_0 - n_1}{n_0 + n_1}$$

wherein $w_2$ is the Fresnel coefficient for the interface between the first and second layers and is equal to $$\frac{n_1 - n_2}{n_1 + n_2}$$

and wherein $w_3$ is the Fresnel coefficient for the interface between the second layer and air and is equal to $$\frac{n_2 - n_3}{n_2 + n_3}$$

and wherein $n_3$ indicates the refractive index of air to which said second layer is to be exposed, depositing said second layer on said first layer to an optical thickness $p_2$ determined in accordance with the optical path value of $p_1$ for said first layer and in accordance with said interface coefficients $w_1$ and $w_2$, said optical path value $p_2$ (the actual thickness expressed in wavelength value $\times$ refractive index $n_2$) of said second layer being in a range between a little more than $\frac{1}{4}$ wavelength to a little more than $\frac{1}{3}$ wavelength at said preselected wavelength and being that value within said last-mentioned range which satisfies the following equation:

$$-2p_2 = \theta_1 - \theta_2$$

wherein $\theta_1$ and $\theta_2$ are interrelated angular values, $\theta_1$ being dependent upon said selected optical path value $p_1$ for said first layer and the coefficients $w_1$ and $w_2$ for the interfaces adjacent said first layer as established by the following pair of equations $$\sin \theta_1 = w_1 \sin 2p_1$$

and $$\cos \theta_1 = -(w_1 \cos 2p_1 + w_2)$$

and $\theta_2$ being dependent upon said established $p_1$ value and the interface coefficients $w_1$ and $w_2$, as established by the following pair of equations $$\sin \theta_2 = w_1 w_2 \sin 2p_1$$

and $$\cos \theta_2 = w_1 w_2 \cos 2p_1 + 1$$

the refractive indices of the bilayer coated optical element thus formed being such as to satisfy the following relationship:

$$n_1^2 > n_2^2 n_0 > n_2^2$$

and $$n_1^2 > n_2^2 n_0 > n_0^2$$

References Cited in the file of this patent

UNITED STATES PATENTS

| | | |
|---|---|---|
| 2,281,474 | Cartwright et al. | Apr. 28, 1942 |
| 2,366,516 | Geffcken | Jan. 2, 1945 |
| 2,366,687 | Osterberg | Jan. 2, 1945 |
| 2,376,428 | Hansell | May 22, 1945 |
| 2,397,929 | Dimmick | Apr. 9, 1946 |
| 2,420,168 | Dimmick | May 6, 1947 |
| 2,478,385 | Gaiser | Aug. 9, 1949 |
| 2,482,054 | Colbert et al. | Sept. 13, 1949 |
| 2,501,563 | Colbert et al. | Mar. 21, 1950 |
| 2,539,149 | Miller | Jan. 23, 1951 |
| 2,552,184 | Koch | May 8, 1951 |
| 2,578,956 | Weinrich | Dec. 18, 1951 |

OTHER REFERENCES

Cartwright et al.: Article in Physical Review of June 1939, page 1128 (article #92).